United States Patent
Hou et al.

(10) Patent No.: US 12,521,697 B2
(45) Date of Patent: Jan. 13, 2026

(54) CEMENT PLUG COMPOSITION FOR APPLICATION TO A CERAMIC HONEYCOMB BODY AND METHOD OF FORMING PLUGGED CERAMIC HONEYCOMB BODY WITH THE SAME

(71) Applicant: CORNING INCORPORATED, Corning, NY (US)

(72) Inventors: Weimin Hou, Shanghai (CN); Yang Li, Shanghai (CN); Jianguo Wang, Shenzhen (CN); Qing Zhou, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 554 days.

(21) Appl. No.: 17/912,628

(22) PCT Filed: Mar. 11, 2021

(86) PCT No.: PCT/US2021/021837
§ 371 (c)(1),
(2) Date: Sep. 19, 2022

(87) PCT Pub. No.: WO2021/188348
PCT Pub. Date: Sep. 23, 2021

(65) Prior Publication Data
US 2023/0148341 A1 May 11, 2023

Related U.S. Application Data

(60) Provisional application No. 62/991,859, filed on Mar. 19, 2020.

(51) Int. Cl.
*B01J 35/57* (2024.01)
*B01J 21/12* (2006.01)
*B01J 31/06* (2006.01)

(52) U.S. Cl.
CPC .............. *B01J 21/12* (2013.01); *B01J 31/06* (2013.01); *B01J 35/57* (2024.01)

(58) Field of Classification Search
None
See application file for complete search history.

(56) References Cited

U.S. PATENT DOCUMENTS

| | | | |
|---|---|---|---|
| 6,613,391 B1 | 9/2003 | Gang | |
| 7,575,618 B2 | 8/2009 | Miao et al. | |
| 8,017,067 B2 | 9/2011 | Custer et al. | |
| 8,435,441 B2 | 5/2013 | Bookbinder et al. | |
| 2007/0234693 A1* | 10/2007 | Miao | C04B 28/005 55/523 |
| 2008/0124504 A1* | 5/2008 | Faber | C04B 35/632 428/34.4 |
| 2008/0307760 A1 | 12/2008 | Chatlani et al. | |
| 2011/0171481 A1 | 7/2011 | Kainz et al. | |
| 2013/0136893 A1 | 5/2013 | Bubb et al. | |
| 2014/0065352 A1* | 3/2014 | Audinwood | B01D 46/2459 428/117 |
| 2017/0232429 A1* | 8/2017 | Aoki | B01J 37/0201 428/117 |
| 2021/0291224 A1 | 9/2021 | Affeldt et al. | |

FOREIGN PATENT DOCUMENTS

| | | |
|---|---|---|
| CN | 101443288 A | 5/2009 |
| CN | 101541710 A | 9/2009 |
| CN | 101801879 A | 8/2010 |
| CN | 104245087 A | 12/2014 |
| CN | 110891993 A | 3/2020 |
| JP | 2016130308 | * 7/2016 |
| JP | 6704732 | * 6/2020 |
| KR | 101692268 | * 4/2017 |

OTHER PUBLICATIONS

Chinese Patent Application No. 202180036306.0, Office Action, dated Jun. 1, 2023, 5 pages, Chinese Patent Office.
Tsukuma et al; "High Temperature Viscosity of Nitrogen Modified Silica Glass"; "Journal of Non-Crystalline Solids", vol. 265, 2000, pp. 199-209.
International Search Report and Written Opinion of the International Searching Authority; PCT/US21/21837; Mailed Jun. 7, 2021; 10 Pages; European Patent Office.

* cited by examiner

*Primary Examiner* — Sheng H Davis

(57) ABSTRACT

A cement composition for plugging a honeycomb body, a plugged honeycomb body, and methods of plugging a honeycomb body are provided. The cement composition includes a source of inorganic particles, an inorganic binder, an organic binder, and a crosslinking agent that is capable of reacting with the inorganic binder and the organic binder. The cement composition can be dried without firing to form water-resistant plugs in a honeycomb body.

18 Claims, 10 Drawing Sheets

CEMENT PLUG COMPOSITION FOR APPLICATION TO A CERAMIC HONEYCOMB BODY AND METHOD OF FORMING PLUGGED CERAMIC HONEYCOMB BODY WITH THE SAME

CROSS REFERENCE TO RELATED APPLICATION

This is a national stage application under 35 U.S.C. § 371 of International Application No. PCT/US2021/021837, filed on Mar. 11, 202021, which claims the benefit of priority under 35 U.S.C. § 119 of U.S. Provisional Application Ser. No. 62/991,859 filed on Mar. 19, 2020, the content of which is relied upon and incorporated herein by reference in their entireties.

BACKGROUND

The present disclosure generally relates to a cement composition for application to a cellular ceramic substrate or filter, and more specifically, to a cement plug composition for application to a ceramic honeycomb body.

Cellular ceramic articles, such as ceramic honeycombs, can be utilized as substrates in catalytic and adsorption applications, such as in catalytic converters, catalyst supports, gas filtration, and particulate filtration. Ceramic honeycombs can be prepared by mixing powdered ceramic precursor materials with a binder and optional solvent to form a ceramic precursor composition that can be shaped to form a green body. The green body is then fired to produce the ceramic honeycomb. Ceramic honeycombs are typically shaped by extrusion through an extrusion die and usually include a skin around an exterior of a body of the honeycomb. The skin may be directly extruded onto the cellular ceramic or applied using other methods, such as spray casting.

In some applications, it may be desirable to seal, also referred to as plug, at least some of the channels of the honeycomb. A conventional process for plugging channels in a honeycomb includes filling the desired channels in a green honeycomb body to a predetermined depth with a plug material and then drying and firing the honeycomb body and the plug material at the same time to form a plugged honeycomb. Some of these plug materials can include an organic binder, which may decompose when the plugged honeycomb is fired at temperatures greater than the decomposition temperature of the organic binder (usually greater than about 400° C.) and reduce the effectiveness of the plug.

Another conventional process for plugging channels in a honeycomb includes firing a green honeycomb body to form a ceramic honeycomb, plugging at least some of the channels with a plug material, and then drying the plug material within the channels to form a plugged honeycomb. However, when the plugged honeycomb is further treated with a treatment solution, such as a catalyst solution or coating solution, some of the dried plug material may release into the solution, which may limit the ability of the treatment solution to be reused. The release of material from the dried plug material may be due to the water solubility of some components of the plug material.

In view of these considerations, there is a need for a cement composition for application to a ceramic substrate, and more specifically, a need for a cement composition for plugging channels in a ceramic honeycomb which does not require firing the cement composition and/or which is substantially insoluble in water.

SUMMARY

According to an aspect of the present disclosure, cement composition for application to a ceramic substrate, including a source of inorganic particles, an inorganic binder, an organic binder, a liquid vehicle, and a crosslinking agent, and wherein the crosslinking agent is capable of reacting with the inorganic binder and the organic binder.

According to another aspect of the present disclosure, a honeycomb structure includes a plurality of intersecting porous ceramic walls extending axially between first and second end faces, with the ceramic walls defining a plurality of channels. A plurality of plugs are disposed in at least some of the plurality of channels. The plugs include a source of inorganic particles, an inorganic binder, an organic binder, and a crosslinking agent, wherein the inorganic binder and the organic binder are cross-linked by the crosslinking agent.

According to yet another aspect of the present disclosure, a method of forming a plugged honeycomb body is provided. The method includes plugging at least a portion of a plurality of channels of a honeycomb structure with a cement composition to form a plugged honeycomb body. The honeycomb structure includes a plurality of intersecting porous ceramic walls extending axially between first and second end faces, with the ceramic walls defining the plurality of channels. The cement composition includes a source of inorganic particles an inorganic binder, an organic binder, a liquid vehicle, and a crosslinking agent. The method also includes reacting the inorganic binder and the organic binder with the crosslinking agent and heating the plugged honeycomb body to evaporate at least a portion of the liquid vehicle from the cement composition to form a plug material.

These and other aspects, objects, and features of the present disclosure will be understood and appreciated by those skilled in the art upon studying the following specification, claims, and appended drawings.

DETAILED DESCRIPTION

Figure 2:
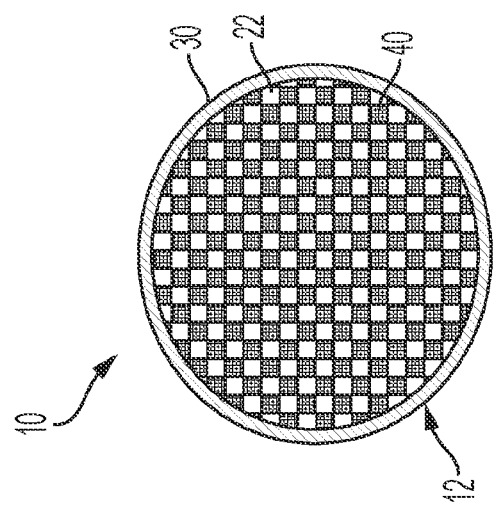
FIG. 2 is a front view of the plugged honeycomb body of FIG. 1, according to an aspect of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

"Shear viscosity", as reported and used herein, was measured by a rotational viscometer (e.g., a KINEXUS Pro+ rheometer, available from Malvern Panalytical. The sample cup was filled with an exact volume of liquid (17.8 mL) and the bob (also referred to as the rotator) was immersed in the liquid. The bob was rotated in the liquid at shear rates of $0.001\ S^{-1}$ to $100\ S^{-1}$ and the viscosity was measured at the different shear rates between $0.001\ S^{-1}$ to $100\ S^{-1}$, inclusive. It is understood that shear viscosity can be measured using other methods and/or equipment and appropriate scaling can be applied for comparison with the values reported herein.

"Cement paste stability", as reported and used herein, was measured using an Imada model MX2-500N vertical motorized test stand with force gauge. The equipment was operated to push a test ball into the paste at a speed of 1500 mm/second and the maximum resisting force was recorded by the equipment. A higher maximum resisting force was indicated of a stiffer paste. It is understood that paste stability can be measured using other methods and/or equipment and appropriate scaling can be applied for comparison with the values reported herein.

"Plug strength", as reported and used herein, was measured using an ALLIRUS 500N force gauge. The material to be measured was placed into the measurement channel and the force required to push the material out of the channel was recorded. A higher force is indicative of a higher plug strength. It is understood that plug strength can be measured using other methods and/or equipment and appropriate scaling can be applied for comparison with the values reported herein.

As used herein, the language "free" or "substantially free," when used to describe a constituent of a composition, batch, melt, or article, refers to a constituent that is not actively added, formed, or batched into the composition, batch, melt, or article, but which may be present in a small as a contaminant and/or due to the inherent degree of uncertainty attributed to any measurement or analysis technique.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

The term "formed from" can mean one or more of comprises, consists essentially of, or consists of. For example, a component that is formed from a particular material can comprise the particular material, consist essentially of the particular material, or consist of the particular material.

Aspects of the present disclosure relate to a cement composition for application to a ceramic substrate, such as a ceramic honeycomb, that includes a source of inorganic particles, an inorganic binder, an organic binder, and a crosslinking agent. According to one aspect of the present disclosure, the cement composition can be used as a plug material for plugging one or more cells of a ceramic honeycomb. In one aspect of the present disclosure, the crosslinking agent is capable of reacting with both the inorganic binder and the organic binder. In another aspect, the crosslinking agent is capable of reacting with the inorganic particles, the inorganic binder, and the organic binder.

According to one aspect of the present disclosure, the cement composition can be used as a plug material that is applied to a ceramic honeycomb and dried, optionally in a single step, at temperatures less than 400° C. According to one aspect of the present disclosure, the cement composition can be applied to a ceramic honeycomb that has already been fired. The cement composition can be capable of plugging the cells of the ceramic honeycomb to form a plugged honeycomb without having to heat the plugged honeycomb to temperatures above 400° C. Some organic binders may start to decompose when heated to temperatures greater than about 400° C. Heating the cement composition of the present disclosure at temperatures less than 400° C. can decrease or avoid decomposition of the organic binder present in the cement composition.

In some applications, a plugged honeycomb may be treated with a treatment solution, such as a catalyst solution, for example. Treatment solutions are typically applied to the honeycomb through a wash and/or dip coating process. During the treatment process, water soluble material present in the plug material, such as for example remaining organic binder material, may release into the treatment solution. The presence of this released material in the treatment solution may affect the ability to re-use the treatment solution and/or may affect the uniformity of treatment. Thus, while lower temperatures for drying the cement material may be desirable in some applications, the presence of remaining organic binder in the plug material after drying may result in the release of organic binder into the treatment solution during a subsequent treatment process. Aspects of the present disclosure provide a cement composition that includes a crosslinking agent that is capable of reacting with at least the organic binder. The crosslinking agent of the present disclosure can react with the organic binder and one or more components of the cement composition to provide a water-resistant cement plug. The water-resistance of the cement plug can facilitate decreasing the release of material from the plug during subsequent processing steps, such as during treatment with a solution containing a catalyst material.

Figure 1:
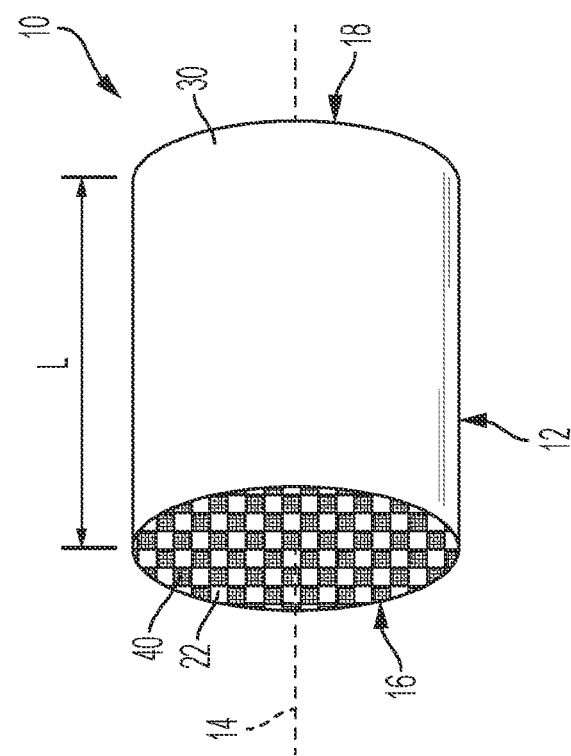
FIG. 1 is a perspective view of a plugged honeycomb body, according to an aspect of the present disclosure.

FIGS. 1-2 illustrate an exemplary ceramic substrate according to aspects of the present disclosure in the form of a honeycomb body 10. The honeycomb body 10 includes a honeycomb structure 12 that extends along a longitudinal axis 14 between opposing first and second end faces 16 and 18. The structure 12 includes a plurality of intersecting porous ceramic walls 20 that define a plurality of cells or cellular channels 22 extending axially between the first and second end faces 16, 18 along the longitudinal axis 14. An optional cement skin 30 can disposed on at least a portion of a periphery of the structure 12 between the first and second end faces 16, 18. While the cement skin 30 is illustrated as covering the entire periphery of the structure 12 over the entire distance between the first and second end faces 16, 18, it is understood that the cement skin 30 may be disposed over only a portion of the periphery and/or may extend over only a portion of the distance between the first and second end faces 16, 18.

The dimensions and physical characteristics of the honeycomb body 10 can be selected based on the intended use of the honeycomb body 10. For example, the honeycomb body 10 can have a cell density of from about 4 cells/cm$^2$ to about 300 cells/cm$^2$. In another example, a thickness of the walls 20 forming the channels 22 is from about 0.04 mm to about 0.5 mm. While the channels 22 are illustrated as having a generally square cross-sectional shape, it is within the scope of the present disclosure for the channels 22 to have other geometric cross-sectional shapes, non-limiting examples of which include hexagonal, triangular, and rectangular.

One or more of the channels 22 can be at least partially plugged with a plug material to form a plugged channel 40. The number of plugged channels 40 and a depth to which each of the plugged channels 40 is plugged with the plug material can be selected based on the end use application of the honeycomb body 10.

The honeycomb body 10 can be formed from a ceramic material, examples of which include cordierite, mullite, alumina, silicon carbide, and aluminum titanate. The honeycomb body 10 can be formed according to any conventional process suitable for forming a honeycomb monolithic body. In one example, a ceramic precursor batch composition can be shaped into a green body according to any known process, examples of which include extrusion, injection molding, slip casting, centrifugal casting, pressure casting, and dry pressing. The shaped green body can then be fired to form a ceramic structure. In some examples, the honeycomb body 10 may be shaped to a desired shape and dimension by selectively removing material. Non-limiting examples of shaping techniques for providing the honeycomb body 10 with the desired shape and dimensions include cutting, sanding, and grinding.

The plugged channels 40 can be formed by providing the desired number of channels 22 with a plug material according to an aspect of the present disclosure. The plug material of the present disclosure can be formed from a cement composition that includes a source of inorganic particles, an inorganic binder, an organic binder, and a crosslinking agent. According to one aspect, the plug material is used to plug a honeycomb body 10 that has already been treated in a ceramming process to form a ceramic honeycomb body 10. In some aspects, the components of the cement composition, including a source of inorganic particles, an inorganic binder, an organic binder, and a crosslinking agent, can be combined with a liquid vehicle to form a slurry and/or paste for application to the channels 22. The liquid vehicle can be at least partially removed by heating the cement composition after application to form a plug material in plugged channels 40. In some aspects, the cement composition can be considered a batch composition that forms a plug following evaporation of at least a portion of the liquid vehicle.

According to one aspect, the source of inorganic particles in the cement composition used to form the plug material can include one or more powdered or particulate inorganic ceramic materials. Exemplary sources of inorganic particles can include cordierite, aluminum titanate, mullite, clay, kaolin, talc, zircon, zirconia, spinel, silicon carbide, silicon nitride, calcium aluminate, and combinations thereof. In one example, the source of inorganic particles can include an inorganic powder batch composition including a composition that has already been fired (i.e., heated to a ceramming temperature). In another example, the source of inorganic particles can be formed by firing a ceramic forming batch composition. For example, a cordierite-forming batch compositing can be heated under conditions suitable to form a ceramic composition including a sintered phase cordierite.

In some aspects, the source of inorganic particles may have a unimodal or multi-modal particle size distribution. For example, the source of inorganic particles can include particles characterized by a particle diameter of from about 5 μm to about 70 μm. In some examples, the source of inorganic particles can include particles characterized by a particle diameter of from about 5 μm to about 70 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 20 μm to about 70 μm, about 20 μm to about 60 μm, about 20 μm to about 50 μm, about 20 μm to about 40 μm, about 20 μm to about 30 μm, about 30 μm to about 70 μm, about 30 μm to about 60 μm, about 30 μm to about 50 μm, about 30 μm to about 40 μm, about 40 μm to about 70 μm, about 40 μm to about 60 μm, about 40 μm to about 50 μm, about 50 μm to about 70 μm, or about 50 μm to about 60 μm. An example of a commercially available source of inorganic particles includes Clayrac™ SF, available from Imerys Ceramics. Clayrac™ SF is described by the manufacturer as including about 90% (by weight) cordierite and about 10% (by weight) mullite and having a $d_{10}$ particle size of about 5 μm, a $d_{50}$ particle size of about 25 μm, and a $d_{90}$ particle size of about 70 μm.

In some aspects, the source of inorganic particles in the cement composition can be present in an amount of from about 50% to about 80% by weight (wt %). For example, the source of inorganic particles can be present in an amount of from about 50 wt % to about 80 wt %, about 50 wt % to about 70 wt %, about 50 wt % to about 60 wt %, about 60 wt % to about 80 wt %, about 60 wt % to about 70 wt %, or about 70 wt % to about 80 wt %.

According to an aspect of the present disclosure, the inorganic binder in the cement composition used to form the plug material can include one or more inorganic binders, examples of which include colloidal silica, silica powder, fumed silica, non-gelled colloidal silica, low-temperature glass powder, glass powder, colloidal alumina, or combinations thereof. An example of a suitable inorganic binder includes Ludox®, available from W.R. Grace & Co., having a solid weight of silica particles in water of 50% and a pH of about 9. In some aspects, the inorganic binder can be present in the cement composition in an amount of from about 10 wt % to about 30 wt %. For example, inorganic binder can be present in the cement composition in an amount of from about 10 wt % to about 30 wt %, about 10 wt % to about 20 wt %, or about 20 wt % to about 30 wt %.

According to an aspect of the present disclosure, the organic binder in the cement composition used to form the plug material can include one or more organic binders, examples of which include methylcellulose, cellulose derivatives, hydroxymethyl cellulose, polyvinyl alcohol, polyvinyl pyrrolidone, hydroxypropyl methylcellulose, and combinations thereof. One example of a suitable organic binder includes METHOCEL™, available from The Dow Chemical Company, having a methoxyl degree of substitution of about 1.8 and a methoxyl concentration of about 30%. In some aspects, the organic binder can be present in the cement composition in an amount of from about 0.5 wt % to about 1.5 wt %. For example, the organic binder can be present in the cement composition in an amount of from about 0.5 wt % to about 1.5 wt %, about 0.75 wt % to about 1.5 wt %, about 1 wt % to about 1.5 wt %, about 1.25 wt % to about 1.5 wt %, about 0.5 wt % to about 1.25 wt %, about 0.75 wt % to about 1.25 wt %, about 1 wt % to about 1.25 wt %, about 0.5 wt % to about 1 wt %, about 0.75 wt % to about 1 wt %, or about 0.5 wt % to about 0.75 wt %.

According to an aspect of the present disclosure, the cement composition can include one or more crosslinking agents. In one aspect, the crosslinking agent is capable of reacting with the inorganic binder and the organic binder. In another aspect, the crosslinking agent is capable of reacting with the inorganic binder, the organic binder, and the inorganic particles. The crosslinking agent can be a formaldehyde derivative that is stable in basic conditions. According to one aspect, the crosslinking agent can be a formaldehyde derivative that includes a stabilizing group, such as a benzene ring. In another aspect, the crosslinking agent is a formaldehyde derivative that includes a reactive carbon between a nitrogen atom and a oxygen atom. For example, the crosslinking agent can be a formaldehyde derivative having a chemical structure that includes multiple branch chains of methyl ethers and melamine.

According to one aspect, the crosslinking agent is given by Formula (I):

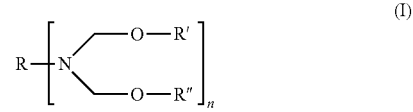

wherein each of R, R', and R" is an aliphatic group, a substituted aliphatic group, an aromatic group, or a substituted aromatic group having a total number of carbon atoms of from 1 to 18, and n is from 1 to 5. For example, each of R, R', and R" is an aliphatic group, a substituted aliphatic group, an aromatic group, or a substituted aromatic group having a total number of carbon atoms of from 1 to 18, 2 to 18, 3 to 18, 5 to 18, 10 to 18, 15 to 18, 1 to 15, 2 to 15, 3 to 15, 5 to 15, 10 to 15, 1 to 10, 2 to 10, 3 to 10, 5 to 10, 1 to 5, 2 to 5, or 3 to 5. In some examples, R can be an aromatic group or a substituted aromatic group having a total number of carbon atoms of from 3 to 10. For example, R can be an aromatic group or a substituted aromatic group having a total number of carbon atoms of from 3 to 10, 5 to 10, 8 to 10, 3 to 8, 3 to 5, or 5 to 8. In some examples, R', and R" is an aliphatic group or a substituted aliphatic group having a total number of carbon atoms of from 1 to 3. In some aspects, n is from 1 to 5, 2 to 5, 3 to 5, 1 to 4, 2 to 4, or 3 to 4.

Examples of crosslinking agents that can be used with the cement compositions of the disclosure include hexamethoxymethylamine (HMMM), trimethyloltrimethylmelamine, hexamethylolmelamine, and combinations thereof. HMMM is an example of a crosslinking agent that can react with the inorganic binder, the organic binder, and the inorganic particles.

According to an aspect of the present disclosure, the crosslinking agent can be present in the cement composition in an amount of from about 0.3 wt % to about 3 wt %. For example, the crosslinking agent can be present in an amount of from about 0.3 wt % to about 3 wt %, about 0.5 wt % to about 3 wt %, about 0.6 wt % to about 3 wt %, about 0.75 wt % to about 3 wt %, about 1 wt % to about 3 wt %, about 1.25 wt % to about 3 wt %, about 1.5 wt % to about 3 wt %, about 1.75 wt % to about 3 wt %, about 2 wt % to about 3 wt %, about 2.25 wt % to about 3 wt %, about 2.5 wt % to about 3 wt %, about 2.75 wt % to about 3 wt %, about 0.3 wt % to about 2.5 wt %, about 0.5 wt % to about 2.5 wt %, about 0.6 wt % to about 2.5 wt %, about 0.75 wt % to about 2.5 wt %, about 1 wt % to about 2.5 wt %, about 1.25 wt % to about 2.5 wt %, about 1.5 wt % to about 2.5 wt %, about 1.75 wt % to about 2.5 wt %, about 2 wt % to about 2.5 wt %, about 0.3 wt % to about 2 wt %, about 0.5 wt % to about 2 wt %, about 0.6 wt % to about 2 wt %, about 0.75 wt % to about 2 wt %, about 1 wt % to about 2 wt %, about 1.25 wt % to about 2 wt %, about 1.5 wt % to about 2 wt %, about 0.3 wt % to about 1.5 wt %, about 0.5 wt % to about 1.5 wt %, about 0.6 wt % to about 1.5 wt %, about 0.75 wt % to about 1.5 wt %, about 1 wt % to about 1.5 wt %, about 0.3 wt % to about 1 wt %, about 0.5 wt % to about 1 wt %, about 0.6 wt % to about 1 wt %, or about 0.75 wt % to about 1 wt %. In some examples, the crosslinking agent can be present in an amount of about 0.3 wt %, about 0.4 wt %, about 0.5 wt %, about 0.6 wt %, about 0.75 wt %, about 1 wt %, about 1.25 wt %, about 1.5 wt %, about 1.75 wt %, about 2 wt %, about 2.25 wt %, about 2.5 wt %, about 2.75 wt %, about 3 wt %, or any amount between these values.

According to one aspect of the present disclosure, the crosslinking agent is present in the cement composition in a ratio of crosslinking agent to organic binder (crosslinking agent:organic binder) of from about 0.5:1 to about 5:1. For example, the ratio of crosslinking agent:organic binder can be from about 0.5:1 to about 5:1, about 0.75:1 to about 5:1, about 1:1 to about 5:1, about 1.5:1 to about 5:1, about 2:1 to about 5:1, about 2.5:1 to about 5:1, about 3:1 to about 5:1, about 3.5:1 to about 5:1, about 4:1 to about 5:1, or about 4.5:1 to about 5:1. In some examples, the ratio of crosslinking agent:organic binder can be about 0.5:1, about 0.75:1, about 1:1, about 1.25:1, about 1.5:1, about 2:1, about 2.5:1, about 3:1, about 3.5:1, about 4:1, about 4.5:1, about 5:1, or any ratio of crosslinking agent:organic binder between these values.

According to one aspect of the present disclosure, the cement composition can include a liquid vehicle. The liquid vehicle can provide a flowable or paste-like consistency to the cement composition for forming a slurry or paste, for example, suitable for plugging channels in a honeycomb structure. According to one aspect, the liquid vehicle is an aqueous vehicle, i.e. water. According to another aspect, the liquid vehicle can be a liquid other than water. An amount of the liquid vehicle can be selected at least in part to provide the cement composition with the desired handling properties (e.g., viscosity) and/or compatibility with the other components in the cement composition. In some aspects, the amount of liquid vehicle in the cement composition can be from about 10 wt % to about 30 wt %. For example, the amount of liquid vehicle in the cement composition can be from about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, or about 25 wt % to about 30 wt %. In some aspects, it may be desirable to minimize the amount of liquid vehicle component while still obtaining a paste like consistency capable of being forced into the channels of the honeycomb structure. Without wishing to be bound by any theory, it is believed that minimizing the liquid vehicle may reduce the degree of shrinkage of the cement composition during drying to form the plug material and/or reduce crack formation during drying.

The cement composition can include one or more additional components based on the end use application of the composition. For example, the cement composition can include rheology modifiers, forming aids, and/or processing aids. Non-limiting examples of additional components include lubricants, ionic surfactants, plasticizers, and sintering aids.

While the cement composition is described in the context of being for use in forming a plug material for plugging channels in a honeycomb structure, such as the plugged channels 40 of FIG. 1, it is within the scope of the present disclosure for the cement compositions described herein to be used to form other structures, such as coatings or other structures for honeycomb structures or other ceramic articles and substrates.

According to aspects of the present disclosure, the cement composition described herein can be used to form a plug material for plugging channels in a honeycomb structure. In one example, the cement composition can be prepared by first blending a source of inorganic particles, inorganic binder, and organic binder together to form a base batch mixture. The base batch mixture can be combined with a crosslinking agent and a liquid vehicle and mixed until homogenous. The amount of liquid vehicle can be selected at least in part based on a desired consistency of the cement composition. For example, the amount of liquid vehicle can be selected to provide a paste or slurry suitable for plugging the desired cells in a particular honeycomb structure.

Exemplary cement compositions for forming a plug material according to the present disclosure are listed below in Tables 1 and 2, identified as "Exemplary Cement Compositions A and B," respectively. Tables 1 and 2 identify the combination of materials and their respective amounts, in ranges, according to the present disclosure. The cement compositions of Tables 1 and 2 may include additional components according to aspects of the present disclosure discussed herein. A liquid vehicle can be combined with any of the Exemplary Cement Compositions A and B in any desired amount, as described above.

TABLE 1

Exemplary Cement Composition A

| Component | Amount range (by weight %) |
| --- | --- |
| Source of inorganic particles | about 50 wt % to about 80 wt % |
| Inorganic binder | about 10 wt % to about 30 wt % |
| Organic binder | about 0.5 wt % to about 1.5 wt % |
| Crosslinking agent | about 0.3 wt % to about 3 wt % |
| | Optional |
| Liquid vehicle | about 10 wt % to about 30 wt % |
| Crosslinking agent: Organic binder | about 0.5:1 to about 5:1 |

TABLE 2

Exemplary Cement Composition B

| Component | Amount range (by weight %) |
| --- | --- |
| Source of inorganic particles | about 50 wt % to about 80 wt % |
| Inorganic binder | about 10 wt % to about 30 wt % |
| Organic binder | about 0.5 wt % to about 1.5 wt % |
| Crosslinking agent | about 0.3 wt % to about 3 wt % Optional |
| Liquid vehicle | about 10 wt % to about 30 wt % |
| Crosslinking agent: Organic binder | about 1:1 |

The plug material of the present disclosure may be derived from the cement compositions of Tables 1 and 2, as described above, and formed by any suitable method for forming a plugged cell in a honeycomb structure or other ceramic article.

Figure 3:
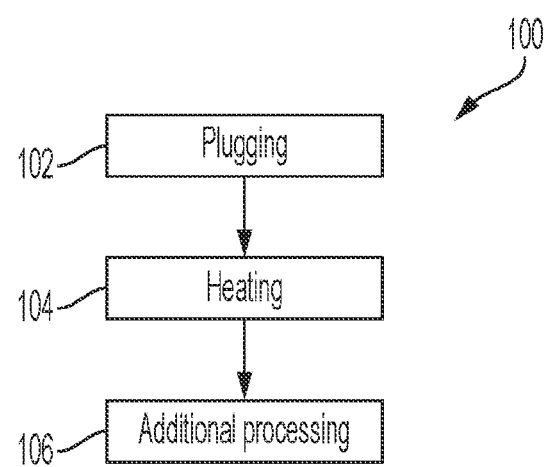
FIG. 3 is a flowchart illustrating a method of plugging a honeycomb body, according to an aspect of the present disclosure.

FIG. 3 illustrates a flow chart for a method 100 of plugging a honeycomb structure according to an aspect of the present disclosure. The method 100 can include a plugging step 102 of selectively plugging at least a portion of a plurality of cellular channels of a honeycomb structure with a cement composition according to aspects of the present disclosure. The cement compositions of the present disclosure can be applied to the channels of a honeycomb structure to form a plugged cell according to any conventional process for plugging channels. For example, the cement compositions of the present disclosure can be combined with a liquid vehicle to form a flowable material, such as a slurry, as described above. The cement composition slurry can be provided between a bottom platen and the second end face 18 of the honeycomb body 10 and a top platen or piston can be moved toward the bottom platen to force at least a portion of the cement composition slurry into the channels 22. Optionally, at least a portion of the channels 22 can be masked such that the cement composition slurry is supplied to only select channels 22 to selectively plug only a portion of the channels 22. Other processes and equipment for suppling a cement composition into the channels of a honeycomb structure can also be used without deviating from the scope of the present disclosure.

After the desired channels 22 have been plugged with the cement composition, the plugged honeycomb body 10 can be heated at step 104 to evaporate at least a portion of the liquid vehicle from the cement composition to form the plugs in the plugged channels 40. The amount of liquid vehicle evaporated from the cement composition during formation of the plug can be selected to provide the plug with the desired characteristics, such as plug strength for example. In one aspect the heating step 104 can be conducted to evaporate the liquid carrier such that the plugs are essentially free from the liquid carrier. As used herein, essentially free of the liquid carrier refers to less than 1% of the liquid carrier remains, by weight of solids content of the plug. In some aspects, essentially free refers to less than 1%, less than 0.5%, less than 0.25%, or less than 0.1% of the liquid carrier remains, by weight of solids content of the plug. In some aspects, the heating step 104 can be conducted to evaporate the liquid carrier such that less than about 5% of the liquid carrier remains, by weight of solids content of the plug. For example, the heating step 104 can be conducted to evaporate the liquid carrier such that less than about 5%, less than about 4%, less than about 3%, less than about 2%, less than about 1%, or less than about 0.5% of the liquid carrier remains, by weight of solids content of the plug. In some examples, the plugged honeycomb body 10 can be heated at step 104 for about 2 hours to about 5 hours, although this time period may vary based at least in part on the materials of the honeycomb structure, the cement paste materials, the drying temperature, and/or the desired degree of dryness (i.e., the desired remaining liquid content).

According to one aspect of the present disclosure, the heating at step 104 can include heating the plugged honeycomb body to a temperature that is less than a decomposition temperature of the organic binder used in the cement composition to form the plugs. For example, the decomposition temperature of typical organic binders can be expected to be greater than about 400° C., in some cases greater than about 450° C., greater than about 500° C., or even greater than 600° C. According to one aspect of the present disclosure, the plugged honeycomb body can be heated at step 104 to a temperature of less than about 600° C., less than about 550° C., less than about 500° C., less than about 450° C., or less than about 400° C. For example, the plugged honeycomb structure can be heated at step 104 to a temperature of from about 100° C. to about 600° C., about 100° C. to about 550° C., about 100° C. to about 500° C., about 100° C. to about 450° C., about 100° C. to about 400° C., about 100° C. to about 350° C., about 100° C. to about 300° C., about 100° C. to about 250° C., about 100° C. to about 200° C., about 100° C. to about 150° C., about 150° C. to about 600° C., about 150° C. to about 550° C., about 150° C. to about 500° C., about 150° C. to about 450° C., about 150° C. to about 400° C., about 150° C. to about 350° C., about 150° C. to about 300° C., about 150° C. to about 250° C., about 150° C. to about 200° C., about 200° C. to about 600° C., about 200° C. to about 500° C., about 200° C. to about 400° C., about 200° C. to about 300° C., about 300° C. to about 600° C., about 300° C. to about 500° C., or about 300° C. to about 400° C. For example, the plugged honeycomb structure can be heated at step 104 to a temperature of about 100° C., about 120° C., about 150° C., about 175° C., about 200° C., about 250° C., about 300° C., about 350° C., about 400° C., about 450° C., about 500° C., about 550° C., about 600° C., or any temperature between these values.

In one aspect, the heating step 104 can include heating the honeycomb body at a single temperature at the above-identified temperatures or within the above-identified temperature ranges for a predetermined period of time. In another aspect, the heating step 104 can include heating to one or more temperatures within the above-identified temperature ranges according to a predetermined temperature profile. The heating step 104 can end after a predetermined period of time or after a predetermined end point is reached. For example, the heating step 104 can be ended once a predetermined amount of the liquid vehicle has evaporated such that the plugs have a predetermined liquid vehicle content or are essentially free of the liquid carrier, as discussed above. The time period for the heating step 104 can vary at least in part based on the dimensions of the honeycomb structure and the plug material, end use applications of the honeycomb body, and/or a desired degree of evaporation of liquid vehicle (i.e., a desired degree of dryness of the plug material). The plugs are considered to be formed from the dried cement composition after completion of the heating step 104.

Following the heating step 104, the plugged honeycomb body can be treated in one or more additional processing steps 106. For example, following the heating step 104, the plugged honeycomb body may be cooled to room temperature for storage and/or for treatment in an additional processing step. The plugged honeycomb body may be passively cooled (e.g., by removing a heat source) and/or actively cooled (e.g., by supplying a cooling airflow).

In one aspect, following the heating step 104, the plugged honeycomb body 10 can be treated with a treatment solution, such as a catalyst solution, such that the catalyst material is disposed in and/or on at least a portion of the porous ceramic walls of the honeycomb structure. In some applications, such as filtering of exhaust emissions, it may be desirable to load the plugged honeycomb structure with a catalyst material to facilitate removal of undesirable species from the emissions that pass through the plugged honeycomb structure. In one example, the catalyst solution can be any conventional catalyst solution including one or more catalyst materials in an aqueous solution. The catalyst solution can be applied to the plugged honeycomb structure according to any known process, examples of which include wash coating, dip coating, and spray coating.

In one aspect, the catalyst material includes one or more inorganic components and/or one or more organic components. Non-limiting examples of an inorganic component includes a precious metal, a base metal, an oxide, and an inorganic oxide. Non-limiting examples of organic components include octanol, alcohol, isopropyl alcohol, glycol, glycerinum, butyl alcohol, organosilicon, and siloxane. Non-limiting examples of an inorganic component includes platinum, palladium, titania, cerium oxide, copper oxide, and alumina. Non-limiting examples of solvents that can be used to form a catalyst solution include water, ethylene glycol, alcohol, butylene, glycol, and combinations thereof. According to one embodiment, the catalyst solution includes water.

According to an aspect of the present disclosure, the plug material formed from the cement composition can be water-resistant. As used herein, water-resistance is defined as an increase in shear viscosity of distilled water of less than about 0.1 Pa·s as measured under shear rates of 0.01 $S^{-1}$ to 100 $S^{-1}$ following immersion of the plug material in distilled water for 65 hours. To determine the water resistance of the plug material, the plug material can be formed on a suitable substrate and the sample can be immersed in distilled water. Material released from the plugs into the water would be expected to result in an increase in the shear viscosity of the water. In this manner, the water resistance of the plug material can be determined based on an increase in the shear viscosity of the water within a predetermined period of time, which is indicative of an amount of material released into the water within that predetermined period of time. An increase in shear viscosity of the water is indicative of a release of material into the water, which is indicative of a degree of water resistance (or lack thereof) of the material. As the water-resistance of a material decreases, the viscosity of the water after 65 hours would be expected to increase. Highly water-resistant material would be expected to cause little to no increase in the viscosity of the water after 65 hours.

In some aspects, the plug material can be characterized by water resistance, as measured by an increase in shear viscosity of distilled water of less than about 0.1 Pascal-second (Pa·s), less than about 0.075 Pa·s, less than about 0.05 Pa·s, or less than about 0.025 Pa·s, as measured under shear rates of 0.01 $s^{-1}$ to 100 $s^{-1}$ following immersion of the plug material in the distilled water for 65 hours. For example, the plug material can be characterized by water resistance, as measured by an increase in shear viscosity of distilled water of from about 0.01 Pa·s to about 0.1 Pa·s, about 0.025 Pa·s to about 0.1 Pa·s, about 0.05 Pa·s to about 0.1 Pa·s, about 0.075 Pa·s to about 0.1 Pa·s, about 0.01 Pa·s to about 0.075 Pa·s, about 0.025 Pa·s to about 0.075 Pa·s, about 0.05 Pa·s to about 0.075 Pa·s, about 0.01 Pa·s to about 0.05 Pa·s, about 0.025 Pa·s to about 0.05 Pa·s, or about 0.01 Pa·s to about 0.025 Pa·s, as measured under shear rates of 0.01 $s^{-1}$ to 100 $s^{-1}$ following immersion of the plug material in the distilled water for 65 hours. In some aspects, the plug material can be characterized by water resistance as described above when immersed in an aqueous solution having a pH of about 7 (e.g., distilled water). In some aspects, the plug material can be characterized by water resistance as described above when immersed in an aqueous solution having a pH of greater than about 2 (e.g., an aqueous solution of a base and/or an acid in distilled water to provide an aqueous solution having the desired pH). In some aspects, the plug material can be characterized by water resistance as described above when immersed in an aqueous solution having a pH of greater than about 2 and less than about 13. For example, the plug material can be characterized by water resistance as described above when immersed in an aqueous solution having a pH of from about 2 to about 13, about 2 to about 12, about 2 to about 10, about 2 to about 8, about 2 to about 7, about 2 to about 6, about 2 to about 5, about 5 to about 13, about 5 to about 12, about 5 to about 10, about 5 to about 8, about 5 to about 7, about 5 to about 6, about 7 to about 13, about 7 to about 12, about 7 to about 10, or about 7 to about 8.

Without wishing to be bound by any theory, it is believed that aspects of the present disclosure provide a cement composition in which a crosslinking agent reacts with both the inorganic binder and the organic binder, and in some cases may also react with the inorganic particles. Providing a crosslinking agent that can react with at least the inorganic binder and the organic binder can provide a water-resistant plug material without having to heat the cement composition to high temperatures, such as ceramic firing temperatures. This allows the cement composition to be used with a ceramic honeycomb that has already been fired in a plugging process that utilizes a single drying step to dry the cement composition to form the plug material to provide a plugged honeycomb structure that is ready for use or further processing (e.g., treatment with a catalyst solution).

The water-resistant characteristic of the plug material can be beneficial when the plug material is used to plug a honeycomb structure that is subsequently treated with a treatment solution, such as a catalyst solution. Comparative plugged honeycomb structures that are plugged with compositions that do not include the crosslinking agent of the present disclosure can result in the release of material into the catalyst solution during treatment. This release of material can be determined as described above by measuring the change in shear viscosity of the catalyst solution. In a manufacturing setting, the release of material into the catalyst solution may limit the ability of the catalyst solution to be re-used. In addition, the release of material into the catalyst solution may affect the uniformity and/or consistency of catalyst loading of the honeycomb bodies over time. The cement compositions of the present disclosure provide a plug material that is water-resistant over a long period of time (e.g., 65 hours), as demonstrated by an increase in shear viscosity of distilled water of less than about 0.1 Pa·s as measured under shear rates of 0.01 $s^{-1}$ to 100 $s^{-1}$, following immersion of the plugged honeycomb body in the distilled water solution for 65 hours.

Figure 4:
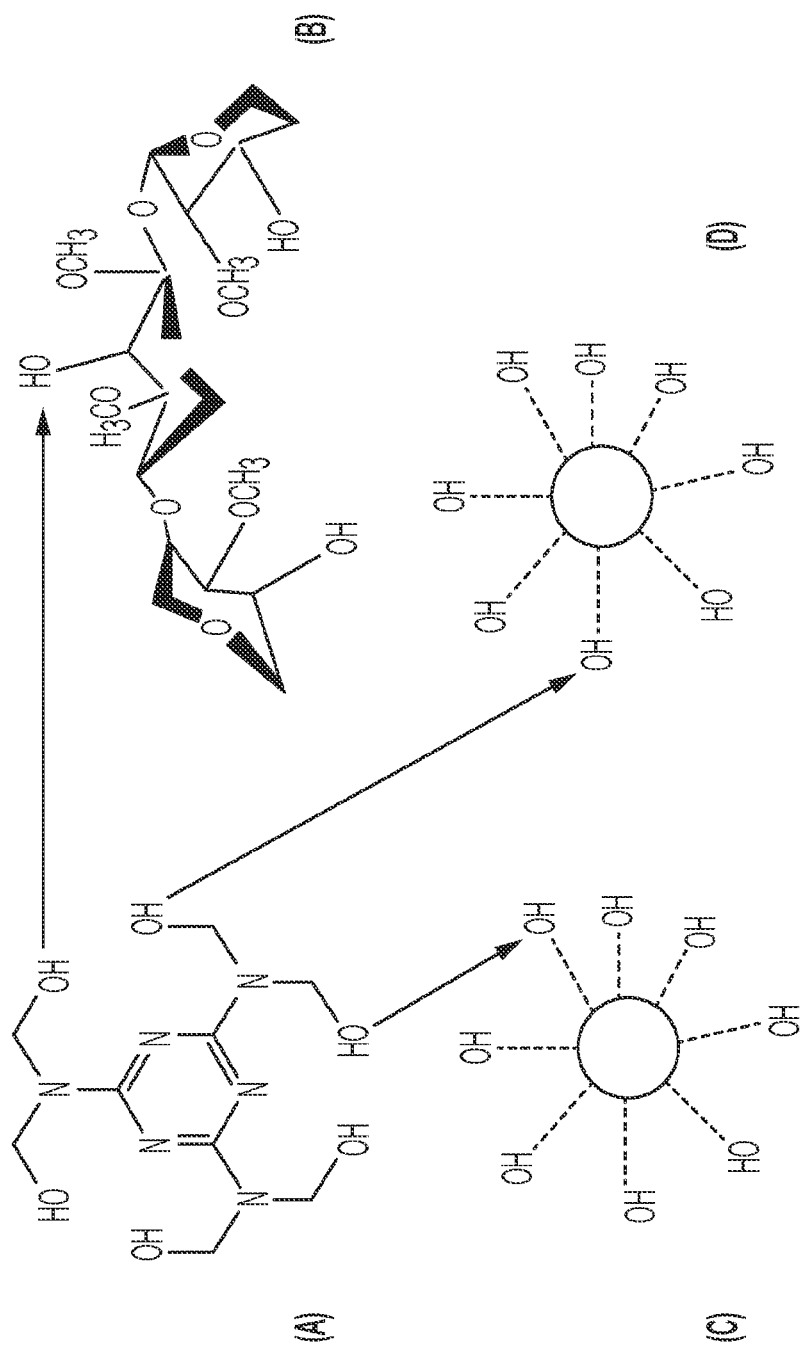
FIG. 4 is a schematic representation of the reaction of a crosslinking agent with an inorganic binder, an organic binder, and inorganic particles of a cement plug composition, according to an aspect of the present disclosure.

Without wishing to be limited by any theory, it is believed that the crosslinking agent, organic binder, and inorganic binder can react through condensation reactions between a functional hydroxyl group (—OH) and/or a functional amine group (—$NH_2$) of these components to form a crosslinked material in which both the organic and inorganic binders are crosslinked. In some cases, when the inorganic particles include a functional hydroxyl or amine group, the crosslinking agent may also react such that the inorganic particles, the organic binder, and the inorganic binder are crosslinked. For example, as illustrated schematically in FIG. 4, when a hexamethoxymethylamine (HMMM) crosslinking agent (structure A) is combined with an organic binder, such as a cellulose ether (structure B), colloidal silica inorganic binder (structure C), cordierite particles (structure D), and a liquid vehicle (e.g., water, not shown), the hydrolyzed HMMM crosslinking agent includes functional hydroxyl groups that can react with the functional hydroxyl groups of the cellulose ether, colloidal silica, and cordierite particles to form a crosslinked material. Crosslinking of at least the organic binder and the inorganic binder in the plug material is believed to contribute at least in part to the water-resistance of the plug material.

While the cement composition is described in the context of being for use in forming cement plugs, such as the plugged channels 40 of FIGS. 1 and 2, it is within the scope of the present disclosure for the cement compositions described herein to be used to form other structures, such as for forming cement skins on honeycomb bodies or for forming other coatings.

EXAMPLES

The following examples describe various features and advantages provided by the disclosure, and are in no way intended to limit aspects of the disclosure disclosed herein or the appended claims.

Example 1

Table 3 below includes exemplary Example Cement Compositions 1A and 1B ("Ex. 1A" and "Ex. 1B") and Comparative Example Cement Compositions 1A-1D ("Comp. Ex. 1A-1D") in grams. As described above, Clayrac™ SF is available from Imerys Ceramics and is described by the manufacturer as including about 90% (by weight) cordierite and about 10% (by weight) mullite. Ludox® is an inorganic binder that is available from W.R. Grace & Co., and has a solid weight of silica particles in water of 50% and a pH of about 9. METHOCEL™ is available from The Dow Chemical Company, and has a methoxyl degree of substitution of about 1.8 and a methoxyl concentration of about 30%. HMMM is a hexamethoxymethylamine crosslinking agent.

TABLE 3

Example and Comparative Cement Compositions

| Material (Component) | HMMM Crosslinking Agent | | No Crosslinking Agent | | Glyoxal Crosslinking Agent | |
|---|---|---|---|---|---|---|
| | Ex. 1A | Ex. 1B | Comp. Ex. 1A | Comp. Ex. 1B | Comp. Ex. 1C | Comp. Ex. 1D |
| Clayrac ™ SF (inorganic particles) | 200 g | 200 g | 200 g | 200 g | 200 g | 200 g |
| METHOCEL ™ (organic binder) | 3 g | 3 g | 3 g | 3 g | 3 g | 3 g |
| Ludox ® (inorganic binder) | 0 | 60 g | 0 | 60 g | 0 | 60 g |
| Crosslinking Agent | 3 g | 3 g | 0 | 0 | 2.5 g | 2.5 g |
| Distilled water (liquid vehicle) | 86 g | 46 g | 62 g | 56 g | 87 g | 49 g |

The cement compositions of Table 3 were all prepared in the same manner by mixing the components to form a paste. The pastes were compacted into paste sheets having a diameter of 80 mm and a thickness of 5 mm. The paste sheets were dried at a temperature of about 120° C. and then cracked into smaller pieces to provide a larger surface area for subsequent viscosity testing.

To assess the water-resistance of Ex. 1A-1B and Comp. Ex. 1A-1D, the cracked paste sheets of each composition were placed into a container of distilled water (test solution) for 65 hours. Following a 65 hour immersion or soaking time period, the viscosity of the test solution in the container was measured using a rheometer, as described above, and the viscosity of the test solution after immersion of the samples was compared with the pre-soak viscosity of the test solution (i.e., the viscosity of distilled water). The test solution was also visually assessed at the end of the 65 hour time period. A change in the viscosity of the test solution at the end of the 65 hour time period is indicative of material being released from the paste sheets into the test solution.

Figure 5:
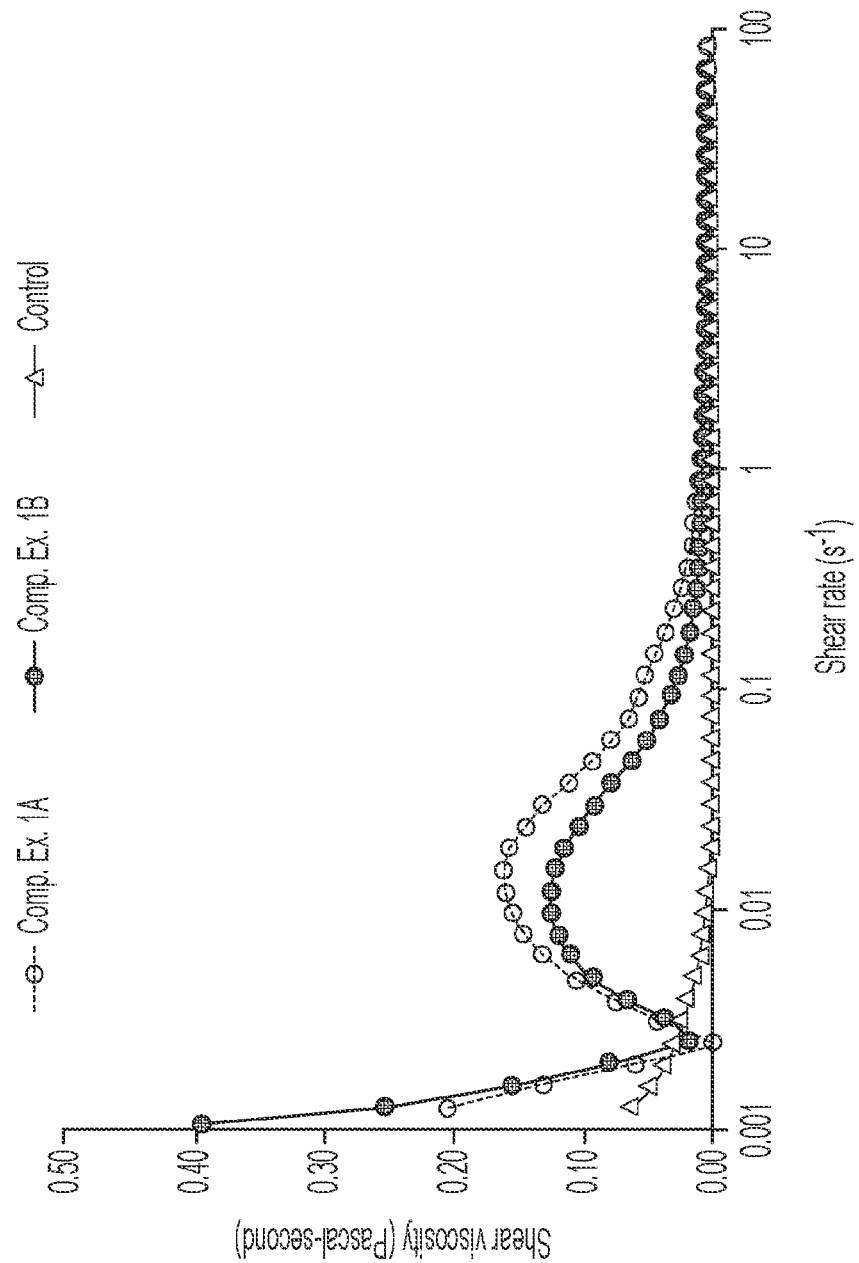
FIG. 5 is a plot of shear viscosity as a function of shear rate for comparative example cement compositions that do not include a crosslinking agent, compared to a control, according to an aspect of the present disclosure.

FIG. 5 shows the results of the water-resistance test for Comparative Examples 1A and 1B, which did not include any crosslinking agent. The viscosity of distilled water (Control) is also shown in the plot for comparison. As shown in FIG. 5, the viscosity of the test solutions for both Comparative Examples 1A and 1B increased significantly after immersion of the samples compared to the Control. The increase in viscosity suggests that material from the paste sheets for Comparative Examples 1A and 1B was being released into the test solution. Comparative Examples 1A and 1B were similar, except for Comparative Example 1A did not include Ludox® (inorganic binder). The viscosity of the test solution increased after immersing both Comparative Examples 1A and 1B, suggesting that the release of the organic binder (METHOCEL™) was most likely responsible for the increase in viscosity.

Figure 6:
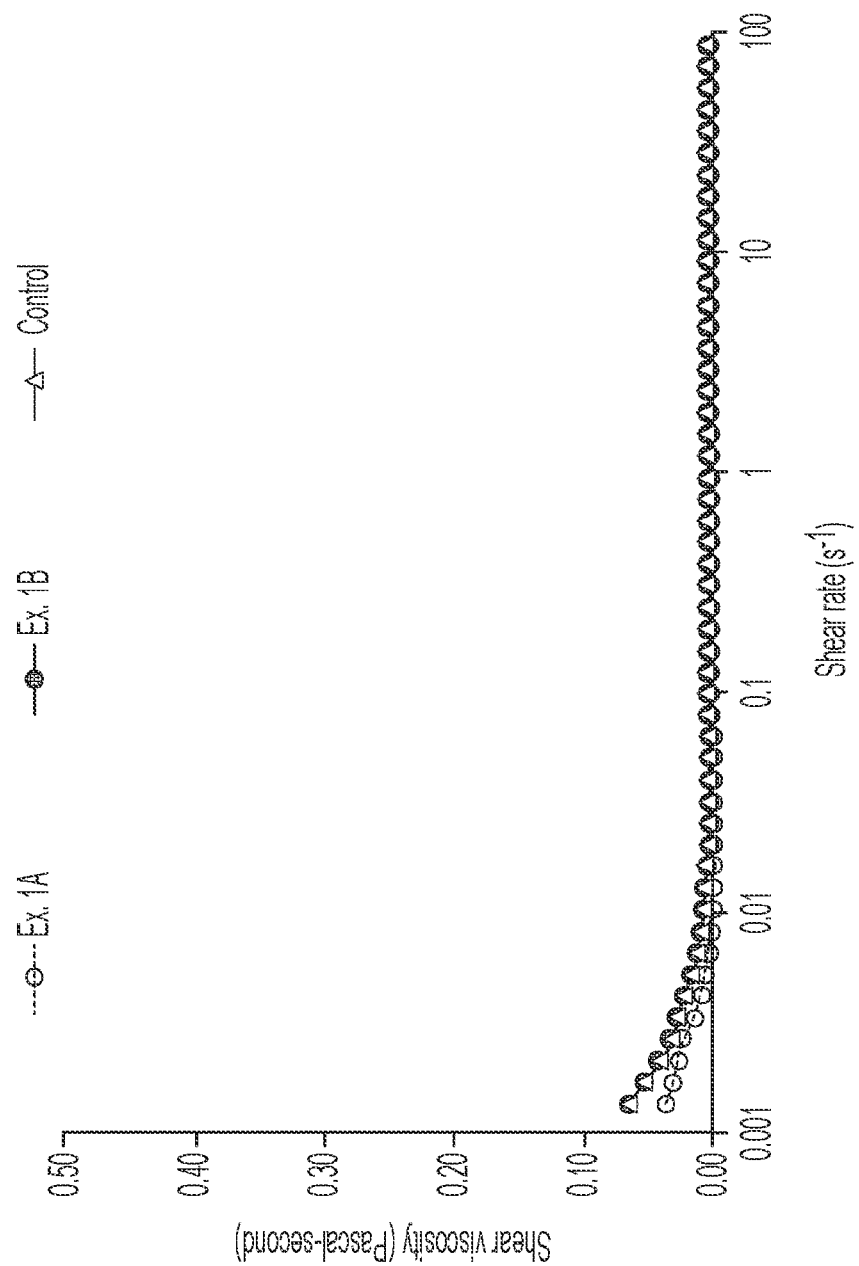
FIG. 6 is a plot of shear viscosity as a function of shear rate for exemplary example cement compositions that include an exemplary crosslinking agent, compared to a control, according to an aspect of the present disclosure.

FIG. 6 shows the results of the water-resistance test for the exemplary examples, Ex. 1A and 1B. The plot compares the viscosity of each solution after immersing the paste sheets for Ex. 1A and 1B in the solution for 65 hours. The viscosity of distilled water (Control) is also shown for comparison. The results in FIG. 6 show that there was little to no change in the viscosity of the solution after immersing the paste sheets for Ex. 1A and 1B in the solution for 65 hours compared to the Control. The minimal change in viscosity is indicative of the lack of release of material from either Ex. 1A or Ex. 1B after immersing the samples, and thus demonstrates the water-resistant characteristics of cement compositions made using a crosslinking agent according to the present disclosure. Both Ex. 1A, which did not include an inorganic binder, and Ex. 1B, which did include an inorganic binder, showed similar results, suggesting that the HMMM crosslinking agent according to the present disclosure is reacting with both the organic binder and the inorganic binder. The data in FIG. 6 demonstrates the ability of the crosslinking agent according to the present disclosure to inhibit the release of material (e.g., organic binder) into an aqueous solution. As discussed above, this water-resistant characteristic of the cement compositions of the present disclosure can be beneficial when the cement composition is subjected to additional treatments (e.g., a catalyst treatment) after plugging a honeycomb structure.

Figure 7:
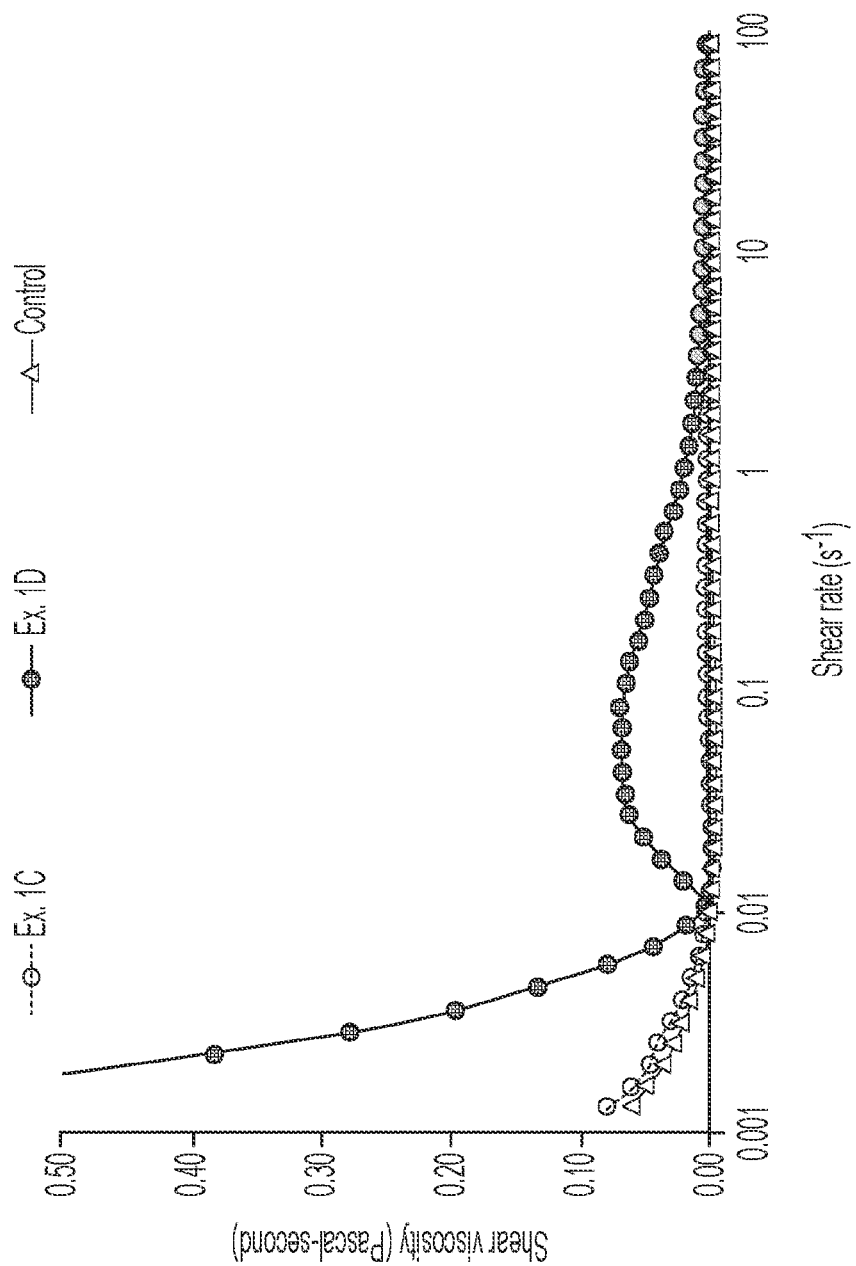
FIG. 7 is a plot of shear viscosity as a function of shear rate for comparative example cement compositions that include a comparative crosslinking agent, compared to a control, according to an aspect of the present disclosure.

FIG. 7 shows the results of the water-resistance test for Comparative Examples 1C and 1D, which include a comparative crosslinking agent. The viscosity of distilled water (Control) is also shown in the plot for comparison. As shown in FIG. 7, the viscosity of the test solution for Comparative Ex. 1D increased significantly after immersion compared to the Control. The increase in viscosity suggests that material from the paste sheet for Comparative Ex. 1D was being released into the test solution. Comparative Ex. 1C was similar to Comparative Ex. 1D, except that Comparative Ex. 1C did not include Ludox® (inorganic binder). Comparative Ex. 1C did not produce a significant increase in the viscosity of the test solution, however, a visual inspection of the samples after soaking showed that the parts had de-bonded, suggesting that the inorganic particles had separated from the paste sheets. Comparing the results for Comparative Ex. 1C and 1D suggest that the glyoxal crosslinking agent was able to react with the organic binder in the absence of the inorganic binder, but was unable to react with the inorganic particles, and thus unable to prevent de-bonding of the inorganic particles. Comparative Ex. 1C showed that in the absence of the inorganic binder, the glyoxal crosslinking agent was able to react with the organic binder to prevent the release of the organic binder into solution, as demonstrated by the minimal change in viscosity of the test solution, but was unable to prevent de-bonding of the inorganic particles. Without wishing to be limited by any theory, it is believed that the Ludox® (inorganic binder) has a high pH value (greater than about 9), which may inhibit the crosslinking ability of the glyoxal crosslinking agent.

Example 2

Exemplary Cement Composition 1B and Comparative Cement Composition 1B from Table 1 were used to plug a honeycomb structure (Ex. 2A and Comp. Ex. 2A, respectively) and the characteristics of the plugged honeycomb structures were assessed. The honeycomb structures for Ex. 2A and Comp. Ex. 2A were a cordierite-based honeycomb structure that was about 2.5 inches (about 63.5 mm) in diameter and about 4 inches (about 101.6 mm) in length, with a cell density of about 200 cells/in$^2$ (about 31 cells/cm$^2$) and a cell wall thickness of about 8 mils (about 0.2 mm). The honeycomb structures for Ex. 2A and Comp. Ex. 2A were plugged using the corresponding cement paste by fitting a plastic mask having selected open areas corresponding to select channels in the honeycomb structure over an end of the honeycomb structure, applying the cement paste over the end of the honeycomb structure, and then applying force to press the cement paste into the channels not blocked by the mask. The honeycomb structure of Ex. 2A was plugged using a cement paste according to the Exemplary Cement Composition 1B from Table 1 and the honeycomb structure of Comp. Ex. 2A was plugged using a cement paste according to the Comparative Cement Composition 1B from Table 1. The plugged honeycomb structures for Ex. 2A and Comp. Ex. 2A were dried at 120° C. for 2 hours to at least partially evaporate the liquid carrier from the cement composition.

Figure 8:
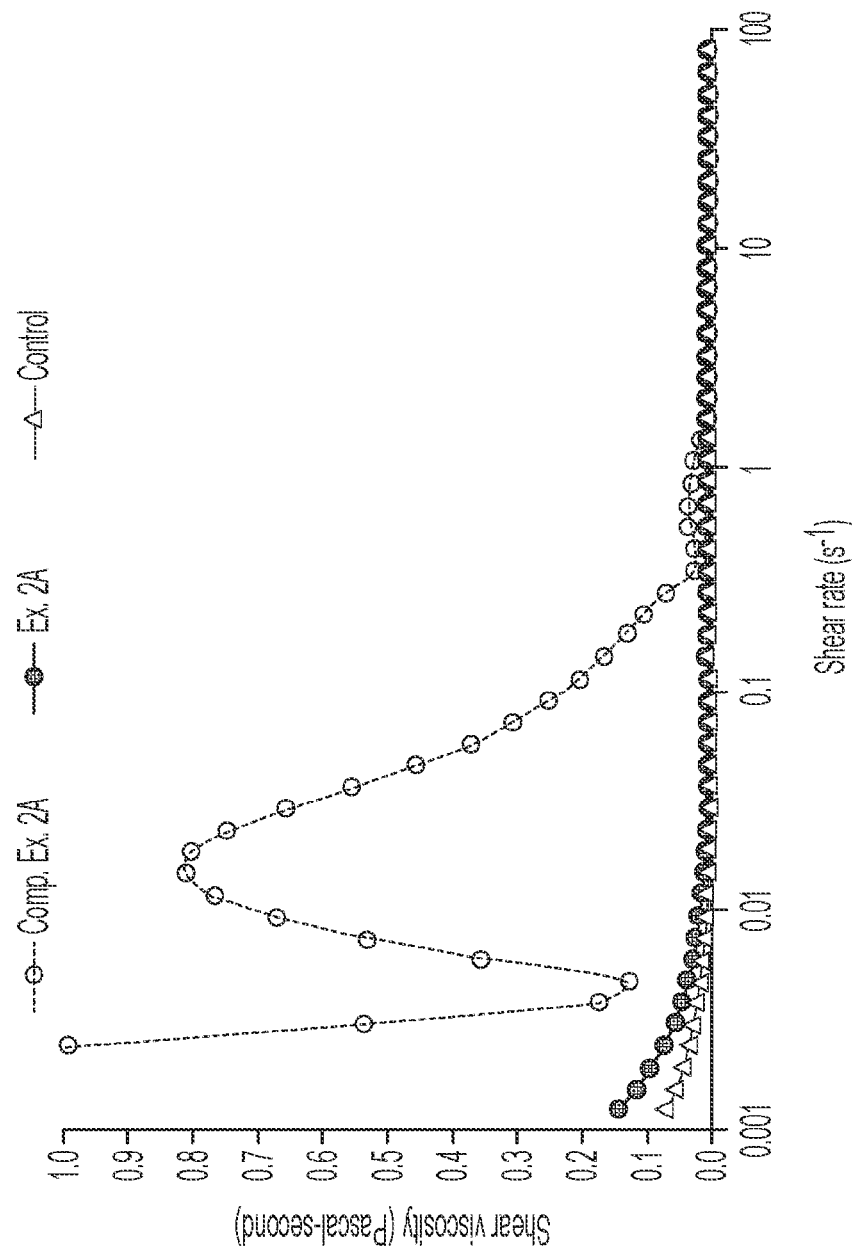
FIG. 8 is a plot of shear viscosity as a function of shear rate for a honeycomb body plugged with an exemplary cement composition and a honeycomb body plugged with a comparative cement composition, compared to a control, according to an aspect of the present disclosure.

The water-resistance of the exemplary and comparative plugged honeycomb structures, Ex. 2A and Comp. Ex. 2A, respectively, were assessed by immersing the plugged honeycomb structures in distilled water for 65 hours and then comparing the viscosity of the test solutions with a Control (distilled water), similar to the process described above in Example 1 with respect to the paste sheets. As illustrated in the plot of FIG. 8, the viscosity of the test solution for Comp. Ex. 2A exhibited a significant increase in viscosity, indicating that material had been released from the plugged honeycomb structure into the test solution. In contrast, the viscosity of the test solution for Ex. 2A showed little to no increase in viscosity, compared to the Control, indicating that the honeycomb structure plugged with an exemplary cement composition according to the present disclosure exhibit water-resistance when immersed in water for at least 65 hours.

Figure 9:
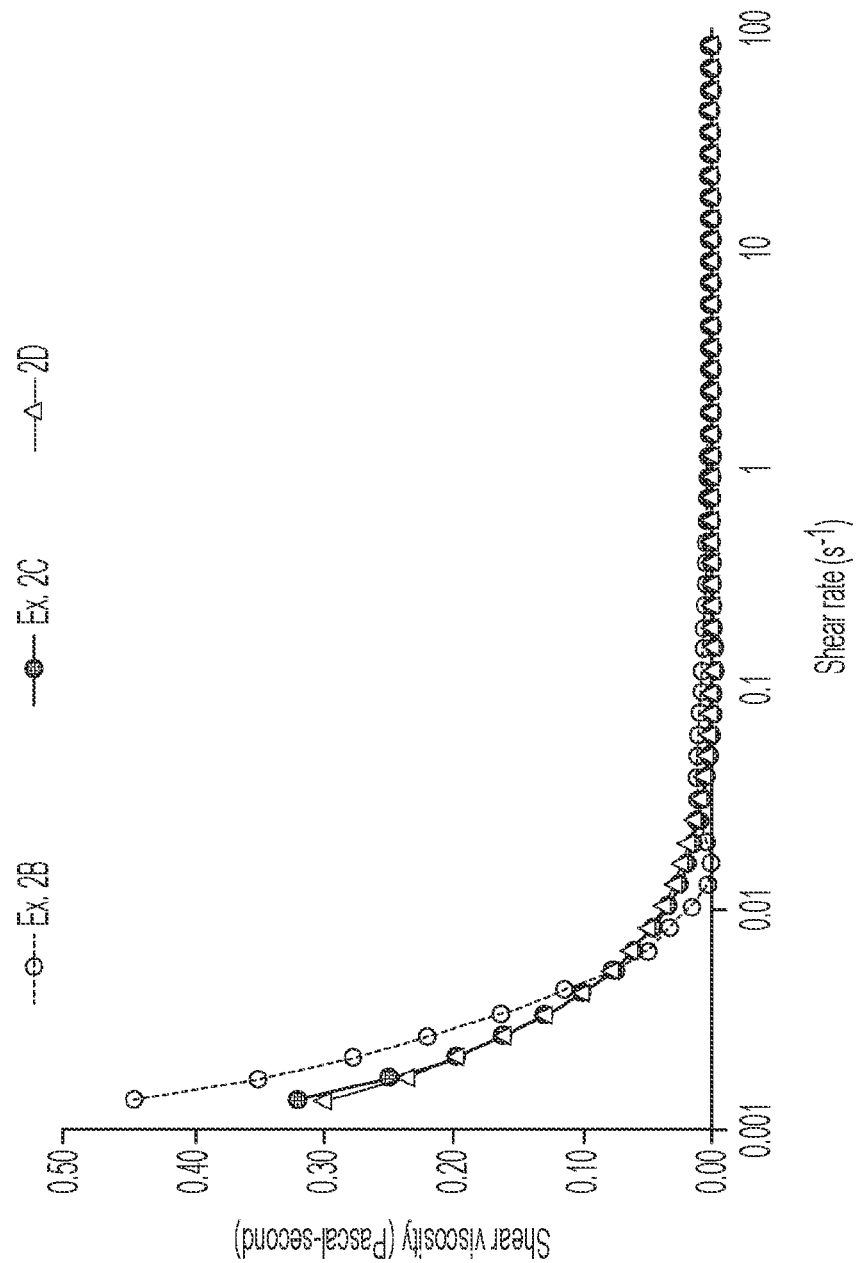
FIG. 9 is a plot of shear viscosity as a function of shear rate for a honeycomb body plugged with an exemplary cement composition after immersion in a solution at pH 2.5, 7, and 12, according to an aspect of the present disclosure.

FIG. 9 is a plot of the viscosity of exemplary plugged honeycomb structures, Ex. 2B-2D, immersed in aqueous solutions having different pH values. Ex. 2B-2D were made in the same manner as described above for Ex. 2A and then immersed for 65 hours in a test solution having a pH of 2.5 (Ex. 2B), a test solution having a pH of 12 (Ex. 2C), and a test solution having a pH of 7 (Ex. 2B). The test solution for Ex. 2B was prepared by adding acetic acid to distilled water to decrease the pH to 2.5. The test solution for Ex. 2C was prepared by adding sodium hydroxide to distilled water to increase the pH to 12. The viscosity of each of the test solutions was measured after 65 hours in a manner similar to that described above for Example 1. As demonstrated in FIG. 9, the viscosity of each of the test solutions were similar, suggesting that the cement compositions of the present disclosure can be used to form a plug material that is water-resistant across a wide range of pH values.

Example 3

Exemplary and comparative plugged honeycomb structures, Ex. 3A and Comp. Ex. 3A, respectively, were made in a manner similar to that described above in Example 2. The honeycomb structure of Ex. 3A was made in the same manner as described above with respect to Ex. 2A and plugged using Exemplary Cement Composition 1B from Table 1. The honeycomb structure of Comp. Ex. 3A was made in the same manner as described above with respect to Comp. Ex. 2A and plugged using Comparative Cement Composition 1B from Table 1.

Figure 10:
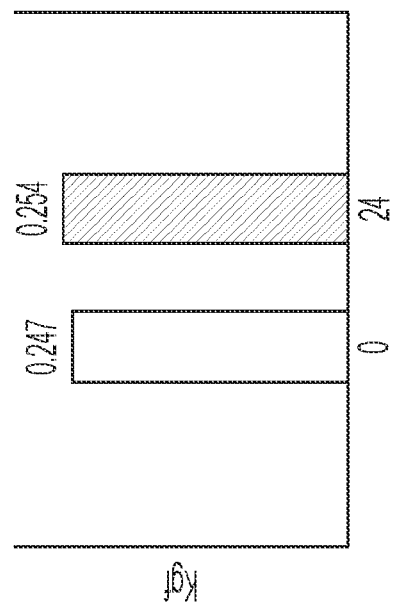
FIG. 10 is a bar graph illustrating the stability of an exemplary cement paste composition at time 0 and after 24 hours, according to an aspect of the present disclosure.

The stability of the cement paste made using Exemplary Cement Composition 1B from Table 1 was assessed after the components had been thoroughly mixed (time 0) and then again after 24 hours. The stability of the cement paste was assessed using a ball push test, as described above, using the Imada model MX2-500N vertical motorized test stand with force gauge. The test ball was pushed into the cement paste at a speed of 1500 mm/second and the maximum resisting force (kilogram-force) was recorded by the equipment. As illustrated in FIG. 10, the maximum resisting force for the cement paste at time 0 and 24 hours after mixing are similar, indicating that the cement paste shows stability during storage.

Figure 11:
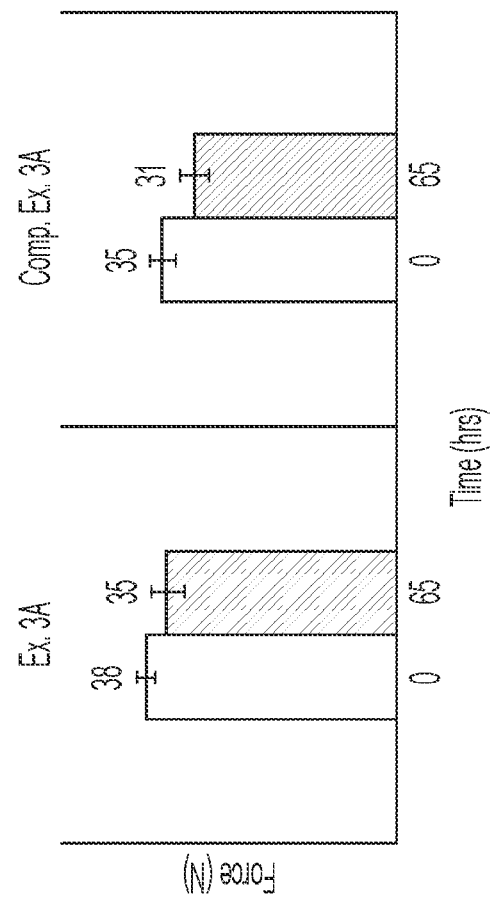
FIG. 11 is a bar graph illustrating plug strength for exemplary plugs and comparative plugs at time 0 and after immersing the plugs in distilled water for 65 hours, according to an aspect of the present disclosure.

The plug strength for Ex. 3A and Comp. Ex. 3A before and after immersion in a test solution for 65 hours was measured using an ALLIRUS 500N force gauge, as described above, and the results are shown in FIG. 11. The amount of force (in Newtons) required to push a plug out of a channel is used as an indication of plug strength. As shown in FIG. 11, the plug strength for Ex. 3A before immersion in distilled water (time 0) and after immersion in the distilled water for 65 hours shows only a small change, similar to the amount of change exhibited by Comp. Ex. 3A, indicating that the plug strength for plugs made according to the methods and exemplary cement compositions of the present disclosure is maintained after immersing the structure in water for 65 hours. FIG. 11 also shows that Ex. 3A and Comp. Ex. 3A exhibit similar plug strength at time 0, indicating that the crosslinking agent of the present disclosure does not significantly negatively impact plug strength.

Figure 12:
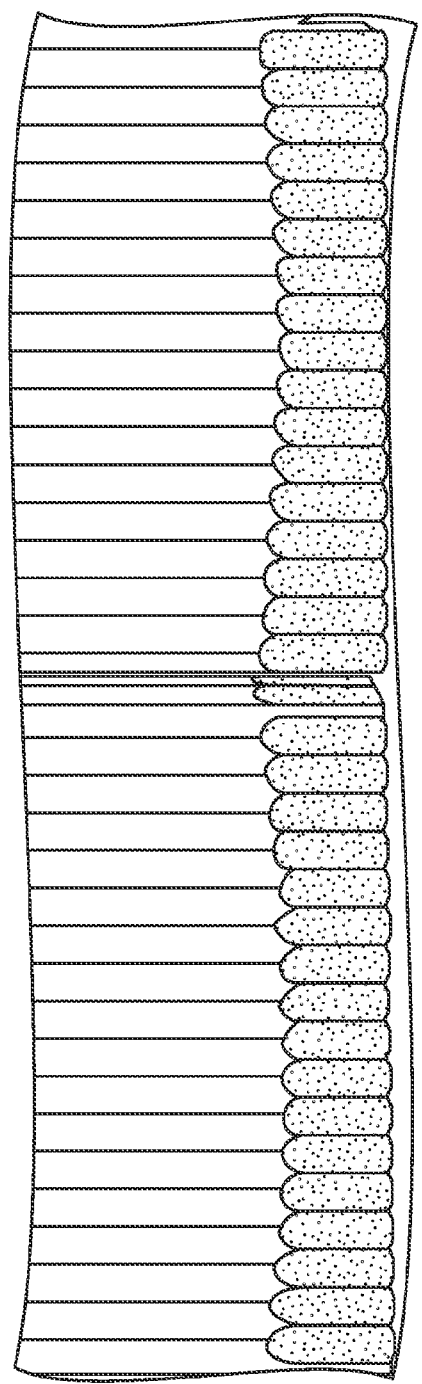
FIG. 12 is an image of a sectional view of channels of a honeycomb body plugged with a cement composition, according to aspects of the present disclosure.

FIG. 12 is a cross-sectional view of channels of honeycomb structures plugged with a cement paste according to Exemplary Cement Composition 1B from Table 1. The images in FIG. 12 show that the exemplary cement composition can form plugs with a consistent plug depth and with little to no voids, cracks, and/or dimples in the plug material.

The following non-limiting aspects are encompassed by the present disclosure. To the extent not already described, any one of the features of the first through the forty-seventh aspect may be combined in part or in whole with features of any one or more of the other aspects of the present disclosure to form additional aspects, even if such a combination is not explicitly described.

According to a first aspect of the present disclosure, a cement composition for application to a ceramic substrate includes: a source of inorganic particles; an inorganic binder; an organic binder; a liquid vehicle; and a crosslinking agent, wherein the crosslinking agent is capable of reacting with the inorganic binder and the organic binder.

According to a second aspect of the present disclosure, the cement composition of aspect 1, wherein the crosslinking agent is given by Formula (I):

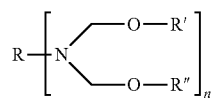

wherein each of R, R', and R" is an aliphatic group, a substituted aliphatic group, an aromatic group, or a substituted aromatic group having a total number of carbon atoms of from 1 to 18, and n is from 1 to 5.

According to a third aspect of the present disclosure, the cement composition of aspect 2, wherein R is an aromatic group or a substituted aromatic group having a total number of carbon atoms of from 3 to 10 and wherein each of R' and R" is an aliphatic group or a substituted aliphatic group having from 1 to 3 carbon atoms.

According to a fourth aspect of the present disclosure, the cement composition of aspect 1, wherein the crosslinking agent includes a chemical structure including multiple branch chains of methyl ethers and melamine.

According to a fifth aspect of the present disclosure, the cement composition of aspect 1, wherein the crosslinking agent includes a formaldehyde derivative.

According to a sixth aspect of the present disclosure, the cement composition of aspect 1, wherein the crosslinking agent includes hexamethoxymethylamine, trimethyloltrimethylmelamine, or hexamethylolmelamine.

According to a seventh aspect of the present disclosure, the cement composition of any one of aspects 1-6, wherein the crosslinking agent is further capable of reacting with the source of inorganic particles.

According to an eighth aspect of the present disclosure, the cement composition of any one of aspects 1-7, wherein the source of inorganic particles includes cordierite, aluminum titanate, mullite, clay, kaolin, talc, zircon, zirconia, spinel, silicon carbide, silicon nitride, calcium aluminate, or combinations thereof.

According to a ninth aspect of the present disclosure, the cement composition of any one of aspects 1-8, wherein the inorganic binder includes colloidal silica, silica powder, fumed silica, non-gelled colloidal silica, low-temperature glass powder, glass powder, colloidal alumina, or combinations thereof.

According to a tenth aspect of the present disclosure, the cement composition of any one of aspects 1-9, wherein the organic binder includes methylcellulose, cellulose derivatives, hydroxymethyl cellulose, polyvinyl alcohol, polyvinyl pyrrolidone, hydroxypropyl methylcellulose, or combinations thereof.

According to an eleventh aspect of the present disclosure, the cement composition of any one of aspects 1-10, wherein a ratio of the crosslinking agent to the organic binder is from about 0.5:1 to about 5:1.

According to a twelfth aspect of the present disclosure, a plugged honeycomb body includes: a honeycomb structure including a plurality of intersecting porous ceramic walls extending axially between first and second end faces, the ceramic walls defining a plurality of channels; and a plurality of plugs disposed in at least some of the plurality of channels, wherein the plugs are included of: a source of inorganic particles; an inorganic binder; an organic binder; and a crosslinking agent, wherein the inorganic binder and the organic binder are cross-linked by the crosslinking agent.

According to a thirteenth aspect of the present disclosure, the plugged honeycomb body of aspect 12, wherein the crosslinking agent includes a formaldehyde derivative.

According to a fourteenth aspect of the present disclosure, the plugged honeycomb body of aspect 12, wherein the crosslinking agent is given by Formula (I):

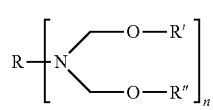

wherein each of R, R', and R" is an aliphatic group, a substituted aliphatic group, an aromatic group, or a substituted aromatic group having a total number of carbon atoms of from 1 to 18, and n is from 1 to 5.

According to a fifteenth aspect of the present disclosure, the plugged honeycomb body of aspect 14, wherein R is an aromatic group or a substituted aromatic group having a total number of carbon atoms of from 3 to 10.

According to a sixteenth aspect of the present disclosure, the plugged honeycomb body of aspect 14, wherein each of R' and R" is an aliphatic group or a substituted aliphatic group having from 1 to 3 carbon atoms.

According to a seventeenth aspect of the present disclosure, the plugged honeycomb body of aspect 12, wherein the crosslinking agent includes a chemical structure including multiple branch chains of methyl ethers and melamine.

According to an eighteenth aspect of the present disclosure, the plugged honeycomb structure of aspect 12, wherein the crosslinking agent includes hexamethoxymethylamine, trimethyloltrimethylmelamine, or hexamethylolmelamine.

According to a nineteenth aspect of the present disclosure, the plugged honeycomb body of any one of aspects 12-18, wherein the source of inorganic particles includes cordierite, aluminum titanate, mullite, clay, kaolin, talc, zircon, zirconia, spinel, silicon carbide, silicon nitride, calcium aluminate, or combinations thereof.

According to a twentieth aspect of the present disclosure, the plugged honeycomb body of any one of aspects 12-19, wherein the inorganic binder includes colloidal silica, silica powder, fumed silica, glass powder, colloidal alumina, non-gelled colloidal silica, low-temperature glass powder, or combinations thereof.

According to a twenty-first aspect of the present disclosure, the plugged honeycomb body of any one of aspects 12-20, wherein the organic binder includes methylcellulose, cellulose derivatives, hydroxymethyl cellulose, polyvinyl alcohol, polyvinyl pyrrolidone, hydroxypropyl methylcellulose, or combinations thereof.

According to a twenty-second aspect of the present disclosure, the plugged honeycomb body of any one of aspects 12-21, wherein a ratio of the crosslinking agent to the organic binder is from about 0.5:1 to about 5:1.

According to a twenty-third aspect of the present disclosure, the plugged honeycomb body of any one of aspects 12-22, wherein the plurality of plugs are water-resistant.

According to a twenty-fourth aspect of the present disclosure, the plugged honeycomb body of any one of aspects 12-23, wherein the plurality of plugs includes less than about 5% water content by weight of plug solids content.

According to a twenty-fifth aspect of the present disclosure, the plugged honeycomb body of any one of aspects 12-24, wherein the plurality of plugs include essentially no water.

According to a twenty-sixth aspect of the present disclosure, the plugged honeycomb body of any one of aspects 12-25, wherein plurality of plugs are unfired plugs.

According to a twenty-seventh aspect of the present disclosure, the plugged honeycomb body of any one of aspects 12-26, wherein the source of inorganic particles includes cordierite, the inorganic binder includes colloidal silica, and the organic binder includes methylcellulose.

According to a twenty-eighth aspect of the present disclosure, the plugged honeycomb body of any one of aspects 12-27, wherein the source of inorganic particles, the inorganic binder, and the organic binder are cross-linked by the crosslinking agent.

According to a twenty-ninth aspect of the present disclosure, the plugged honeycomb body of any one of aspects 12-28, wherein a catalyst material is disposed in or on at least a portion of the porous ceramic walls.

According to a thirtieth aspect of the present disclosure, the plugged honeycomb body of aspect 29, wherein the catalyst material includes one or more inorganic components selected from a precious metal, base metal, oxides, and inorganic oxides.

According to a thirty-first aspect of the present disclosure, the plugged honeycomb body of aspect 29, wherein the catalyst material includes one or more organic components selected from octanol, alcohol, isopropyl alcohol, glycol, glycerinum, butyl alcohol, organosilicon, and siloxane.

According to a thirty-second aspect of the present disclosure, a method of forming a plugged honeycomb body includes: plugging at least a portion of a plurality of channels of a honeycomb structure with a cement composition to form a plugged honeycomb body, the honeycomb structure including a plurality of intersecting porous ceramic walls extending axially between first and second end faces, the ceramic walls defining the plurality of channels, the cement composition including: a source of inorganic particles; an inorganic binder; an organic binder; a liquid vehicle; and a crosslinking agent; reacting the inorganic binder and the organic binder with the crosslinking agent; and heating the plugged honeycomb body to evaporate at least a portion of the liquid vehicle from the cement composition to form a plug material.

According to a thirty-third aspect of the present disclosure, the method of aspect 32, wherein the crosslinking agent includes a formaldehyde derivative.

According to a thirty-fourth aspect of the present disclosure, the method of aspect 32, wherein the crosslinking agent is given by Formula (I):

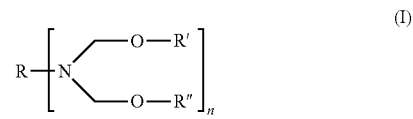

wherein each of R, R', and R" is an aliphatic group, a substituted aliphatic group, an aromatic group, or a substituted aromatic group having a total number of carbon atoms of from 1 to 18, and n is from 1 to 5.

According to a thirty-fifth aspect of the present disclosure, the method of any one of aspects 32-34, wherein the heating the plugged honeycomb body to evaporate at least a portion of the liquid vehicle includes heating until less than about 500 of the liquid vehicle, by weight of the solids content of the cement composition, remains.

According to a thirty-sixth aspect of the present disclosure, the method of any one of aspects 32-34, wherein the heating the plugged honeycomb body to evaporate at least a portion of the liquid vehicle includes heating until essentially all of the liquid vehicle is evaporated.

According to a thirty-seventh aspect of the present disclosure, the method of any one of aspects 32-36, wherein the heating the plugged honeycomb body to evaporate at least a portion of the liquid vehicle includes heating to a temperature less than a decomposition temperature of the organic binder.

According to a thirty-eighth aspect of the present disclosure, the method of any one of aspects 32-36, wherein the heating the plugged honeycomb body to evaporate at least a portion of the liquid vehicle includes heating to a temperature less than 400° C.

According to a thirty-ninth aspect of the present disclosure, the method of any one of aspects 32-38, further including: subsequent to heating the plugged honeycomb body, treating the plugged honeycomb body with a catalyst material to deposit the catalyst material at least one of in or on at least a portion of the porous ceramic walls.

According to a fortieth aspect of the present disclosure, the method of aspect 39, wherein the catalyst material includes one or more inorganic components selected from a precious metal, base metal, oxide, and inorganic oxide.

According to a forty-first aspect of the present disclosure, the method of aspect 39, wherein the catalyst material includes one or more organic components selected from octanol, alcohol, isopropyl alcohol, glycol, glycerinum, butyl alcohol, organosilicon, and siloxane.

According to a forty-second aspect of the present disclosure, the method of any one of aspects 32-41, wherein the source of inorganic particles includes cordierite, aluminum titanate, mullite, clay, kaolin, talc, zircon, zirconia, spinel, silicon carbide, silicon nitride, calcium aluminate, or combinations thereof.

According to a forty-third aspect of the present disclosure, the method of any one of aspects 32-42, wherein the inorganic binder includes colloidal silica, silica powder, fumed silica, non-gelled colloidal silica, low-temperature glass powder, glass powder, colloidal alumina, or combinations thereof.

According to a forty-fourth aspect of the present disclosure, the method of any one of aspects 32-43, wherein the organic binder includes methylcellulose, cellulose derivatives, hydroxymethyl cellulose, polyvinyl alcohol, polyvinyl pyrrolidone, hydroxypropyl methylcellulose, or combinations thereof.

According to a forty-fifth aspect of the present disclosure, the method of any one of aspects 32-44, wherein a ratio of the crosslinking agent to the organic binder is from about 0.5:1 to about 5:1.

According to a forty-sixth aspect of the present disclosure, the method of any one of aspects 32-45, wherein the crosslinking agent includes hexamethoxymethylamine, trimethyloltrimethylmelamine, or hexamethylolmelamine.

According to a forty-seventh aspect of the present disclosure, the method of any one of aspects 32-46, further including: reacting the inorganic particles with the crosslinking agent.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed. All such modifications and variations are intended to be included herein within the scope of this disclosure and protected by the following claims. It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A plugged honeycomb body, comprising:
   a honeycomb structure comprising a plurality of intersecting porous ceramic walls extending axially between first and second end faces, the ceramic walls defining a plurality of channels; and
   a plurality of plugs disposed in at least some of the plurality of channels, wherein the plugs are comprised of:
      a source of inorganic particles;
      an inorganic binder;
      an organic binder; and
      a crosslinking agent,
   wherein the inorganic binder and the organic binder are cross-linked by the crosslinking agent,
   wherein the crosslinking agent is given by Formula (I):

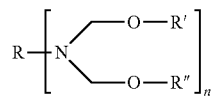

(I)

wherein each of R, R', and R" is an aliphatic group, a substituted aliphatic group, an aromatic group, or a substituted aromatic group having a total number of carbon atoms of from 1 to 18, and n is from 1 to 5.

2. The plugged honeycomb body of claim 1, wherein the crosslinking agent comprises a formaldehyde derivative.

3. The plugged honeycomb body of claim 1, wherein R is an aromatic group or a substituted aromatic group having a total number of carbon atoms of from 3 to 10.

4. The plugged honeycomb body of claim 1, wherein each of R' and R" is an aliphatic group or a substituted aliphatic group having from 1 to 3 carbon atoms.

5. The plugged honeycomb body of claim 1, wherein the crosslinking agent comprises a chemical structure comprising multiple branch chains of methyl ethers and melamine.

6. The plugged honeycomb structure of claim 1, wherein the crosslinking agent comprises hexamethoxymethylamine, trimethyloltrimethylmelamine, or hexamethylolmelamine.

7. The plugged honeycomb body of claim 1, wherein a ratio of the crosslinking agent to the organic binder is from about 0.5:1 to about 5:1.

8. The plugged honeycomb body of claim 1, wherein the source of inorganic particles, the inorganic binder, and the organic binder are cross-linked by the crosslinking agent.

9. The plugged honeycomb body of claim 1, wherein a catalyst material is disposed in or on at least a portion of the porous ceramic walls.

10. The plugged honeycomb body of claim 9, wherein the catalyst material comprises one or more inorganic components selected from a precious metal, base metal, oxides, and inorganic oxides.

11. The plugged honeycomb body of claim 9, wherein the catalyst material comprises one or more organic components selected from octanol, alcohol, isopropyl alcohol, glycol, glycerinum, butyl alcohol, organosilicon, and siloxane.

12. A method of forming a plugged honeycomb body, the method comprising:
   plugging at least a portion of a plurality of channels of a honeycomb structure with a cement composition to form a plugged honeycomb body, the honeycomb structure comprising a plurality of intersecting porous ceramic walls extending axially between first and second end faces, the ceramic walls defining the plurality of channels, the cement composition comprising:
      a source of inorganic particles;
      an inorganic binder;
      an organic binder;
      a liquid vehicle; and
      a crosslinking agent;
   reacting the inorganic binder and the organic binder with the crosslinking agent; and
   heating the plugged honeycomb body to evaporate at least a portion of the liquid vehicle from the cement composition to form a plug material,
   wherein the crosslinking agent is given by Formula (I):

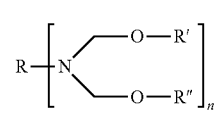

(I)

wherein each of R, R', and R" is an aliphatic group, a substituted aliphatic group, an aromatic group, or a substituted aromatic group having a total number of carbon atoms of from 1 to 18, and n is from 1 to 5.

13. The method of claim 12, wherein the crosslinking agent comprises a formaldehyde derivative.

14. The method of claim 12, wherein the heating the plugged honeycomb body to evaporate at least a portion of the liquid vehicle comprises heating to a temperature less than a decomposition temperature of the organic binder.

15. The method of claim 12, further comprising:
subsequent to heating the plugged honeycomb body, treating the plugged honeycomb body with a catalyst material to deposit the catalyst material at least one of in or on at least a portion of the porous ceramic walls.

16. The method of claim 12, wherein a ratio of the crosslinking agent to the organic binder is from about 0.5:1 to about 5:1.

17. The method of any one of claim 12, wherein the crosslinking agent comprises hexamethoxymethylamine, trimethyloltrimethylmelamine, or hexamethylolmelamine.

18. The method of claim 12, further comprising:
reacting the inorganic particles with the crosslinking agent.

\* \* \* \* \*